US008539209B2

(12) United States Patent
Pogor et al.

(10) Patent No.: US 8,539,209 B2
(45) Date of Patent: Sep. 17, 2013

(54) MICROPROCESSOR THAT PERFORMS A TWO-PASS BREAKPOINT CHECK FOR A CACHE LINE-CROSSING LOAD/STORE OPERATION

(75) Inventors: Bryan Wayne Pogor, Round Rock, TX (US); Colin Eddy, Austin, TX (US)

(73) Assignee: VIA Technologies, Inc., New Taipei (TW)

( * ) Notice: Subject to any disclaimer, the term of this patent is extended or adjusted under 35 U.S.C. 154(b) by 994 days.

(21) Appl. No.: 12/607,301

(22) Filed: Oct. 28, 2009

(65) Prior Publication Data

US 2011/0047314 A1 Feb. 24, 2011

Related U.S. Application Data

(60) Provisional application No. 61/236,275, filed on Aug. 24, 2009.

(51) Int. Cl.
*G06F 9/312* (2006.01)
(52) U.S. Cl.
USPC ............ 712/227; 712/225; 712/244; 717/129
(58) Field of Classification Search
USPC .......................... 712/225, 227, 244; 717/129
See application file for complete search history.

(56) References Cited

U.S. PATENT DOCUMENTS 5,608,867 A * 3/1997 Ishihara ........................ 714/47.1
6,009,510 A * 12/1999 Henry et al. .................. 712/204
2007/0033577 A1* 2/2007 Arackal ........................ 717/124

FOREIGN PATENT DOCUMENTS

JP 63197248 A * 8/1988

* cited by examiner

*Primary Examiner* — David J Huisman
(74) *Attorney, Agent, or Firm* — E. Alan Davis; James W. Huffman

(57) ABSTRACT

A microprocessor breakpoint-checks a load/store operation specifying a load/store virtual address of data whose first and second pieces are within first and second cache lines. A queue of entries each include first storage for an address associated with the operation and second storage for an indicator indicating whether there is a match between a page address portion of the virtual address and a page address portion of a breakpoint address. During a first pass through a load/store unit pipeline, the unit performs a first piece breakpoint check using the virtual address, populates the second storage indicator, and populates the first storage with a physical address translated from the virtual address. During the second pass, the unit performs a second piece breakpoint check using the indicator received from the second storage and an incremented version of a page offset portion of the load/store physical address received from the first storage.

23 Claims, 6 Drawing Sheets

MICROPROCESSOR THAT PERFORMS A TWO-PASS BREAKPOINT CHECK FOR A CACHE LINE-CROSSING LOAD/STORE OPERATION

CROSS REFERENCE TO RELATED APPLICATION(S)

This application claims priority based on U.S. Provisional Application Ser. No. 61/236,275, filed Aug. 24, 2009, entitled FAST AND EFFICIENT DETECTION OF BREAKPOINTS, which is hereby incorporated by reference in its entirety.

FIELD OF THE INVENTION

The present invention relates in general to the field of microprocessors, and particularly to debug breakpoint facilities provided thereby.

BACKGROUND OF THE INVENTION

The x86 architecture, like most microprocessor architectures, provides a means for a programmer to specify debug breakpoints on an access to one or more address ranges. In particular, the breakpoint address ranges are virtual address ranges (referred to as linear addresses in x86 parlance). In some processors, the load unit performs the check to determine whether a load address accesses a breakpoint range.

Sometimes a load spans two cache lines, so it must be broken up into two pieces, as shown in FIG. 4, such that each piece is sent down the load pipeline to access the data cache. The first piece is sent down the load pipeline to access the data cache with the initial load address and a first size (which is the number of bytes implicated by the first piece) in order to obtain the data from the first implicated cache line, and subsequently the second piece is sent down the load pipeline to access the data cache with an incremented version of the initial load address and a second size (which is the number of bytes implicated by the second piece) to obtain the data from the second implicated cache line. This case makes the breakpoint check more complex, as discussed in more detail below, because the load unit must check each piece against the breakpoint ranges.

Some further background information is helpful. Each load queue entry includes storage space for an address field. Initially, the load unit loads the load virtual address into the address field. The load unit subsequently translates the load virtual address into a load physical address (in order to access the data cache) and subsequently replaces the virtual address with the physical address in the address field. Having a single address field in each load queue entry minimizes the storage requirements of the load queue and therefore saves die real estate space and power consumption. However, the single address field causes a problem in the cache-line-spanning/two-piece load case because when the load unit pipeline processes the first piece it clobbers the virtual address such that the second piece no longer has the virtual address to perform the breakpoint checking.

One solution to the problem is to include space in each load queue entry for two addresses. That way, the physical address can be written to the second address field to avoid clobbering the virtual address, or each address field can be associated with a different piece so that each piece has its own virtual address when it needs it and can clobber its own virtual address without affecting the other piece. However, this solution is undesirable because the additional storage space associated with the second address field consumes a significant additional amount of die real estate and power.

Another solution that avoids the additional address storage space is to perform additional passes through the load pipeline. That is, the first piece is sent down the load pipeline to perform the breakpoint checking, then the second piece is sent down the load pipeline to perform the breakpoint checking, then the first piece is sent down the load pipeline to generate the physical address and access the cache, then the second piece is sent down the load pipeline to generate the physical address and access the cache. This solution is undesirable because it is slower.

SUMMARY OF INVENTION

In one aspect the present invention provides a microprocessor configured to perform a full breakpoint check on a cache line-crossing load/store operation (CLCLSO), the CLCLSO specifying a load/store virtual address of data, wherein a first piece of the data is within a first cache line and a second piece of the data is within a second cache line. The microprocessor includes a breakpoint register configured to store a breakpoint address. The microprocessor also includes a queue of entries, wherein each of the entries includes first storage for storing an address associated with a load/store operation and second storage for storing an indicator that indicates whether there is a match between a page address portion of the load/store virtual address and a page address portion of the breakpoint address. The microprocessor also includes a load/store unit pipeline, coupled to the breakpoint register and the queue, wherein the load/store unit pipeline is configured to execute a cache line-crossing load/store operation during first and second passes through the pipeline to access the first and second pieces of the data, respectively, with a cache memory. During the first pass, the load/store unit performs a first piece breakpoint check using the load/store virtual address, specified by the CLCLSO, populates the indicator in the second storage associated with the CLCLSO, and populates the first storage associated with the CLCLSO with a load/store physical address translated from the load/store virtual address. During the second pass, the load/store unit performs a second piece breakpoint check using the indicator received from the second storage associated with the CLCLSO and an incremented version of a page offset portion of the load/store physical address received from the first storage associated with the CLCLSO. The load/store unit is configured to access the cache memory and perform the breakpoint check for the CLCLSO in no more than two passes through the load/store unit pipeline. The first storage in each of the queue entries is the only storage for storing an address associated with the load/store operation.

In another aspect, the present invention provides a method within a microprocessor having a cache memory for performing a breakpoint check on a cache-line crossing load/store operation (CLCLSO), the CLCLSO specifying a load/store virtual address of data, a first piece of the data being within a first cache line and a second piece of the data being within a second cache line, the microprocessor including a breakpoint register for storing a breakpoint address, the microprocessor also including a queue of entries, each of the including first storage for storing an address associated with a respective load/store operation and second storage for storing an indicator that indicates whether there is a match between a page address portion of the load/store virtual address specified by the respective load/store operation and a page address portion of the breakpoint address, the microprocessor including a load/store unit pipeline. The method includes, during a first pass through the load/store unit pipeline: performing a first piece breakpoint check associated with the first piece of data, wherein said performing the first piece breakpoint check comprises comparing the breakpoint address with the load/store virtual address specified by the CLCSO; populating the indicator in the second storage, associated with the CLCLSO; and populating the first storage associated with the CLCLSO with a load/store physical address resulting from translation of the load/store virtual address. The method also includes, during a second pass through the load/store unit pipeline: performing a second piece breakpoint check associated with the second piece of data, wherein said performing the second piece breakpoint check comprises examining the indicator received from the second storage associated with the CLCLSO and comparing a page offset portion of the breakpoint address with the page offset portion of an incremented version of the load/store physical address received from the first storage associated with the CLCLSO. The cache memory is accessed and the breakpoint check is performed for the CLCLSO in no more than two passes through the load/store unit pipeline. The first storage in each of the queue entries is the only storage for storing an address associated with the respective load/store operation.

In yet another aspect, the present invention provides a computer program product encoded in at least one non-transitory computer usable medium for use with a computing device, the computer program product comprising computer usable program code embodied in said medium for specifying a microprocessor configured to perform a full breakpoint check on a cache line-crossing load/store operation (CLCLSO), the CLCLSO specifying a load/store virtual address of data, wherein a first piece of the data is within a first cache line and a second piece of the data is within a second cache line. The computer usable program code includes first program code for specifying a breakpoint register configured to store a breakpoint address. The computer usable program code also includes second program code for specifying a queue of entries, wherein each of the entries includes first storing an address association with a respective load/store operation and second storage for storing an indicator that indicates whether there is a match between a page address portion of a load/store virtual address specified by the respective load/store operation and a page address portion of the breakpoint address, wherein the CLCLSO is one of the respective load/store operations. The computer usable program code also includes third program code for specifying a load/store unit pipeline coupled to the breakpoint register and the queue, wherein the load/store unit pipeline is configured to execute the cache line-crossing load/store operation during first and second passes through the load/store unit pipeline to access the first and second pieces of the data, respectively, with a cache memory. During the first pass, the load/store unit pipeline performs a first piece breakpoint check using the load/store virtual address specified by the CLCLSO, populates the indicator in the second storage associated with the CLCLSO, and populates the first storage associated with the CLCLSO with a load/store physical address resulting from translation of the load/store virtual address. During the second pass, the load/store unit pipeline performs a second piece breakpoint check using the indicator received from the second storage associated with the CLCLSO and an incremented version of a page offset portion of the load/store physical address received from the first storage associated with the CLCLSO. The load/store unit pipeline is configured to access the cache memory and perform the full breakpoint check for the CLCLSO in no more than two passes through the load/store unit pipeline. The first storage in each of the queue entries is the only storage for storing an address associated with the respective load/store operation.

DETAILED DESCRIPTION OF THE INVENTION

Described herein are embodiments that provide a solution that does not require additional passes through the load pipeline and requires a single additional bit per breakpoint register per load queue entry and a small amount of additional logic. The embodiments take advantage of the facts that: (1) breakpoint ranges cannot span page boundaries, and (2) the address bits that are different between the two pieces are bits that do not get translated (by the virtual to physical translation). Thus, as long as the two cache lines are in the same physical page, the bits of the virtual address that get translated of the first and second pieces either will both match the corresponding bits of a breakpoint range or will both not match. More specifically, when the load pipeline processes the first piece (i.e., performs the breakpoint check on the first piece virtual address, generates the physical address, accesses the cache, and replaces the virtual address in the load queue entry address field with the physical address), it also saves in the load queue entry a hit_page indication of whether the virtual page bits of the first piece (i.e., the bits of the virtual address that must be translated to obtain the physical page) matched any of the corresponding breakpoint address bits. When the load pipeline processes the second piece, to perform the break point check it uses the hit_page indication as a surrogate for the comparison that would otherwise have had to be made of the second piece virtual page bits with the corresponding breakpoint address bits. The would-be comparison can no longer be made because the virtual address has been clobbered by the physical address when the load unit processed the first piece, which is advantageously acceptable because of the presence of the hit_page indication.

Figure 1:
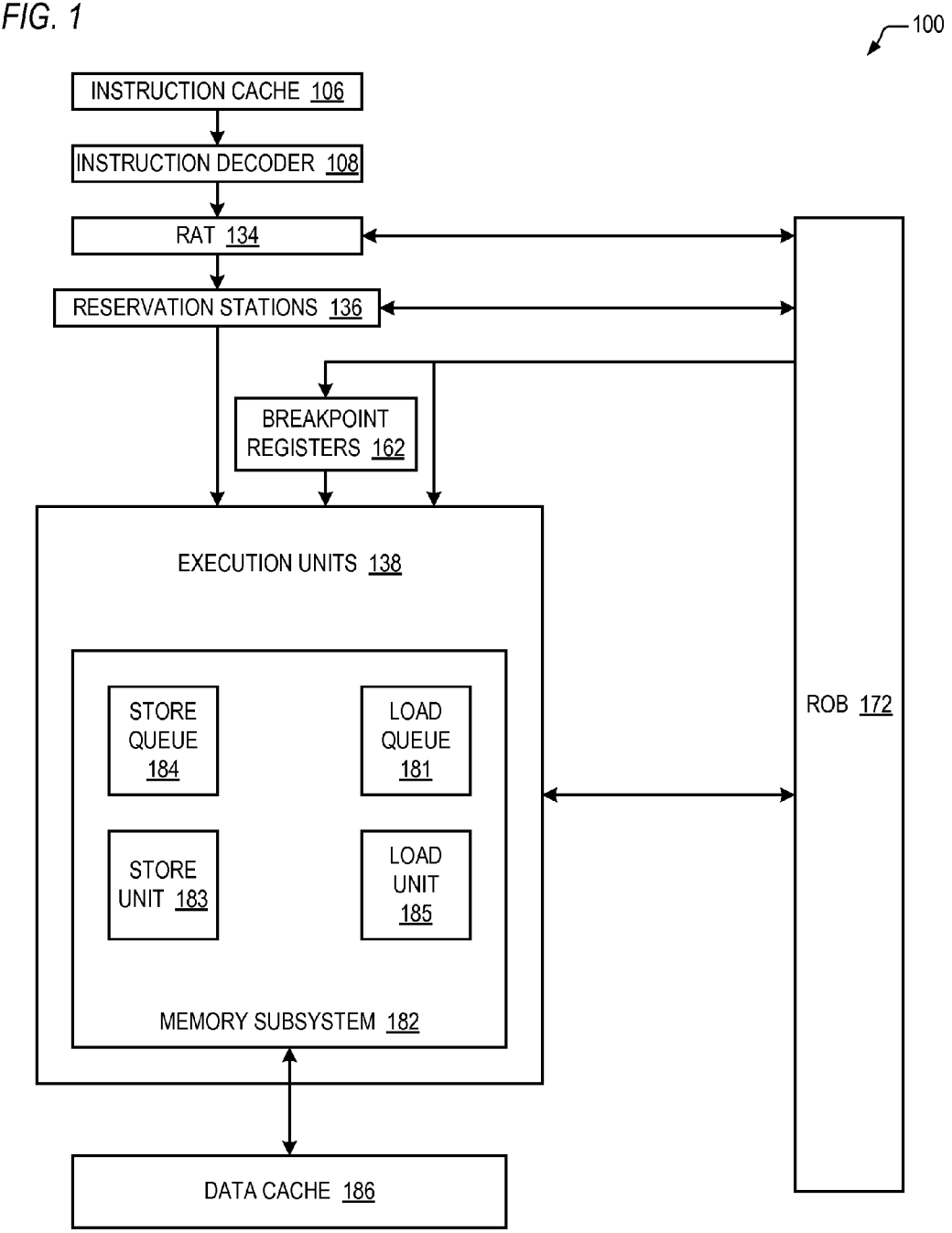
FIG. 1 is a block diagram illustrating a microprocessor according to the present invention.

Referring now to FIG. 1, a block diagram illustrating a microprocessor 100 according to the present invention is shown. The microprocessor 100 includes an instruction cache 106 coupled to an instruction decoder 108 coupled to a register alias table (RAT) 134 coupled to reservation stations 136 coupled to execution units 138 in a pipelined fashion. The execution units 138 include a memory subsystem 182 that includes a load queue 181, load unit 185, store queue 184, and store unit 183. The microprocessor 100 also includes a data cache 186 coupled to the memory subsystem 182. The microprocessor 100 also includes breakpoint registers 162 coupled to the execution units 138. The microprocessor 100 also includes a reorder buffer (ROB) 172 coupled to the RAT 134, reservation stations 136, breakpoint registers 162, and execution units 138. Embodiments of the load unit 185 and their operation are described in more detail with respect to FIGS. 2-3 and 5-6.

Figure 2:
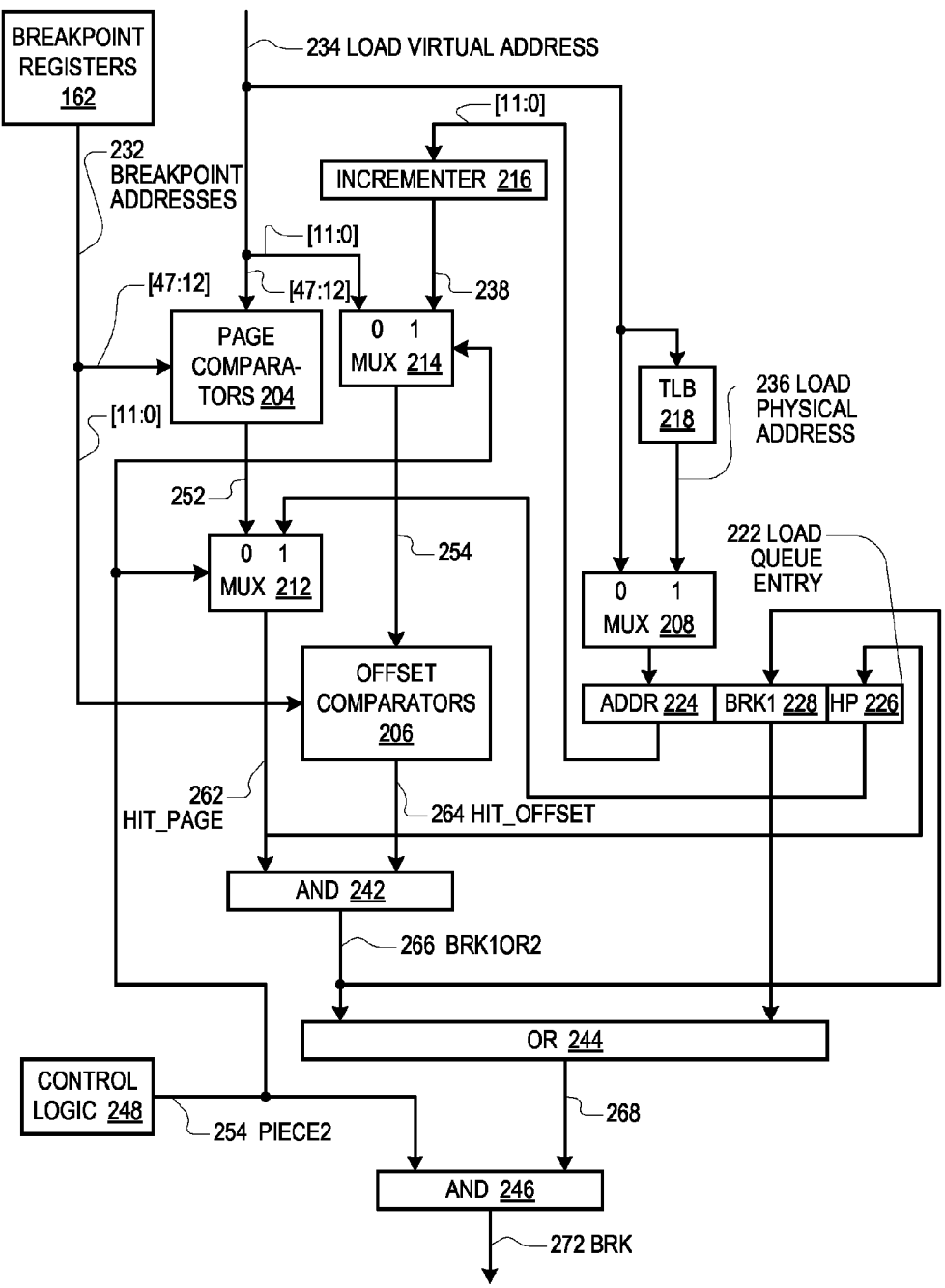
FIG. 2 is a block diagram illustrating a load unit of the microprocessor of FIG. 1.

Referring now to FIG. 2, a block diagram illustrating a load unit 185 of the microprocessor 100 of FIG. 1 is shown. The load unit 185 receives a load instruction and computes a load virtual address 234 from the address operands received along with the load instruction.

FIG. 2 shows the breakpoint registers 162 of the microprocessor 100 of FIG. 1. In one embodiment, the breakpoint registers 162 comprise the debug breakpoint registers of the x86 architecture that a programmer programs to specify one or more address ranges.

FIG. 2 shows an entry 222 of the load queue 181 of the microprocessor 100 of FIG. 1. The load queue 181 comprises a plurality of load queue entries 222, only one of which is shown in FIG. 2, that has been allocated to a load instruction issued to the load unit 185 by the reservation stations 136 of the microprocessor 100 of FIG. 1. Each load queue entry 222 includes storage space for an address field 224, a first indicator field 228 (referred to as brk1 228 in FIG. 2), and a second indicator field 226 (referred to as hp 226 in FIG. 2). The brk1 indicator 228 indicates whether the load virtual address 234 of the first piece of the load instruction falls within one of the breakpoint address ranges specified in the breakpoint registers 162. The hp indicator 226 indicates whether the virtual page address bits (discussed below) of the first piece of the load instruction matched the corresponding bits of one of the breakpoint addresses 232.

A translation lookaside buffer (TLB) 218 of the load unit 185 receives the load virtual address 234 and responsively outputs a load physical address 236, which has the virtual page address bits of the load virtual address 234 translated to the physical page address as is well-known in the art of virtual memory systems. A 2:1 mux 208 receives on one input the load virtual address 234 and on the other input the load physical address 236. When the load unit 185 generates the load virtual address 234, the load unit 185 controls the mux 208 to load the load virtual address 234 into the address field 224 of the load queue entry 222. When the TLB 218 generates the load physical address 236, the load unit 185 loads the load physical address 236 into the address field 224.

The load unit 185 includes page comparators 204 that receive the upper bits of the load virtual address 234. In one embodiment, the upper bits of the load virtual address 234 comprise bits [47:12] of the virtual address. In the case of 4 KB memory pages, bits [47:12] specify the virtual memory page, and are referred to as the virtual page address bits. In a virtual memory system, the virtual page address bits are the bits that must be translated from a virtual memory page address to a physical memory page address. The page comparators 204 also receive the breakpoint addresses 232 from the breakpoint registers 162. Specifically, the page comparators 204 receive the upper bits of the breakpoint addresses 232 corresponding to the received upper bits of the load virtual address 234. The page comparators 204 compare the upper bits of the load virtual address 234 with the upper bits of each of the breakpoint addresses 232 and generate a match signal 252 that is true if the comparison yields any matches.

The load unit 185 includes a 2:1 mux 212 that receives on one input the output 252 of the page comparators 204. On the other input, the mux 212 receives the value of the hp indicator 226 from the load queue entry 222. Control logic 248 generates a piece2 control signal 254 that controls the mux 212. The piece2 signal 254 is true during the processing of the second piece and is false during the processing of the first piece. Thus, the piece2 signal 254 causes the mux 212 to select the match output 252 when the first piece of the load instruction is being processed and to select the hp indicator 226 when the second piece of the load instruction is being processed. The mux 212 provides the selected input on a hit_page output 262. When the load unit 185 is processing the first piece, the control logic 248 causes the hit_page output 262 value to be loaded into the hp indicator 226 of the load queue entry 222.

The load unit 185 also includes an incrementer 216 that receives the lower bits of the address field 224 from the load queue entry 222. In one embodiment, the lower bits comprise bits [11:0], which are referred to as the offset bits because they specify the offset within a 4 KB page. The incrementer 216 increments the offset bit that is the least significant cache line bit. The incrementer 216 causes the increment of the least significant cache line bit to ripple through to the other lower/offset bits, i.e., to the result. In one embodiment, the size of a cache line is 64 bits; thus, bits [5:0] specify an offset within a cache line, and bit [6] is the least significant cache line bit. The incremented result 238 is provided as an input to a 2:1 mux 214. The other input of the mux 214 receives the corresponding lower/offset bits of the load virtual address 234. The piece2 signal 254 causes the mux 214 to select the incrementer 216 output 238 when the second piece of the load instruction is being processed and to select the lower/offset bits of the load virtual address 234 when the first piece of the load instruction is being processed. The mux 214 provides the selected input on an output 254.

The load unit 185 also includes offset comparators 206 that receive the lower/offset bits 254 output from the mux 214. The offset comparators 206 also receive the lower bits of the breakpoint addresses 232 corresponding to the received lower/offset bits 254 from the mux 214 and information from the breakpoint registers 162 indicating the sizes of the breakpoint virtual address ranges. The offset comparators 206 compare the received bits and generate a hit_offset signal 264 that is true if the comparison yields any matches, i.e., if the lower/offset bits 254 fall within any of the ranges specified in the breakpoint registers 162. In one embodiment, the offset comparators 206 only compare bits [11:2] and additionally examine byte enables associated with the load instruction and the breakpoint addresses 232 to generate the hit_offset signal 264.

A 2-input AND gate 242 receives the hit_page signal 262 and the hit_offset signal 264 to generate a brk1or2 signal 266. The brk1or2 signal 266 is true during processing of the first piece if the load virtual address 234 of the first piece falls within one of the breakpoint address ranges specified in the breakpoint registers 162. The brk1or2 signal 266 is true during processing of the second piece if the load virtual address of the second piece (which is effectively the load virtual address 234 of the first piece with its least significant cache line bit incremented) falls within one of the breakpoint address ranges specified in the breakpoint registers 162. When the load unit 185 is processing the first piece, the control logic 248 causes the hit_offset output 264 value to be loaded into the brk1 indicator 228 of the load queue entry 222.

A 2-input OR gate 244 receives the brk1or2 signal 266 and the value of the brk1 field 228 from the load queue entry 222 to generate a result 268. A 2-input AND gate 246 receives the piece2 signal 254 and the output 268 of the OR gate 244 to generate a brk signal 272. Thus, during processing of the second piece, the AND gate 246 generates a true value on the brk signal 272 if either the first piece or the second piece triggered a breakpoint. The brk signal 272 is provided to the ROB 172 of the microprocessor 100 of FIG. 1, and the ROB 172 responsively sets a bit within an entry associated with the load instruction such that when the load instruction is ready to retire, the microprocessor 100 takes a debug breakpoint exception.

Figure 3:
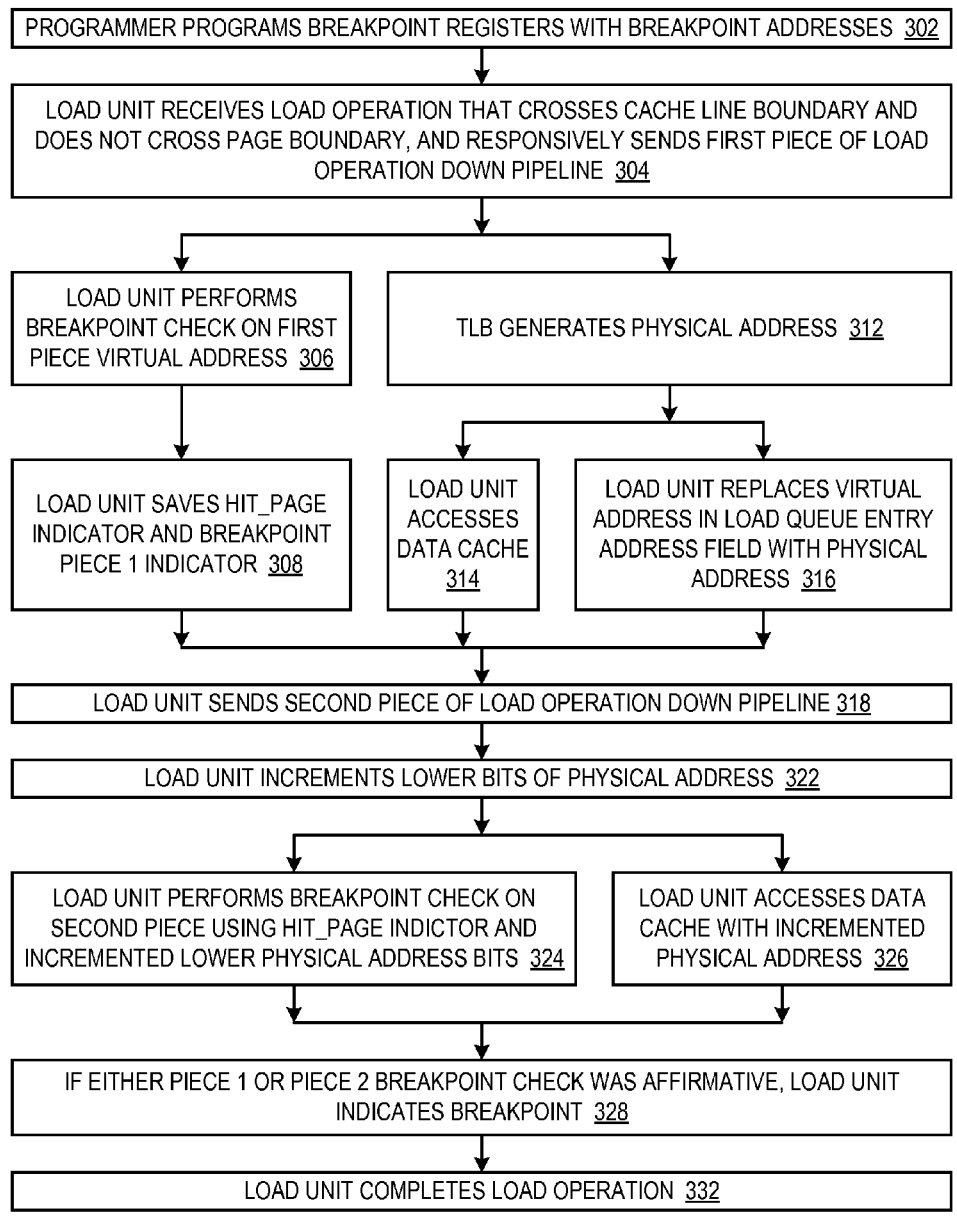
FIG. 3 is a flowchart illustrating operation of the microprocessor of FIG. 1 including the load unit of FIG. 2.
Figure 4:
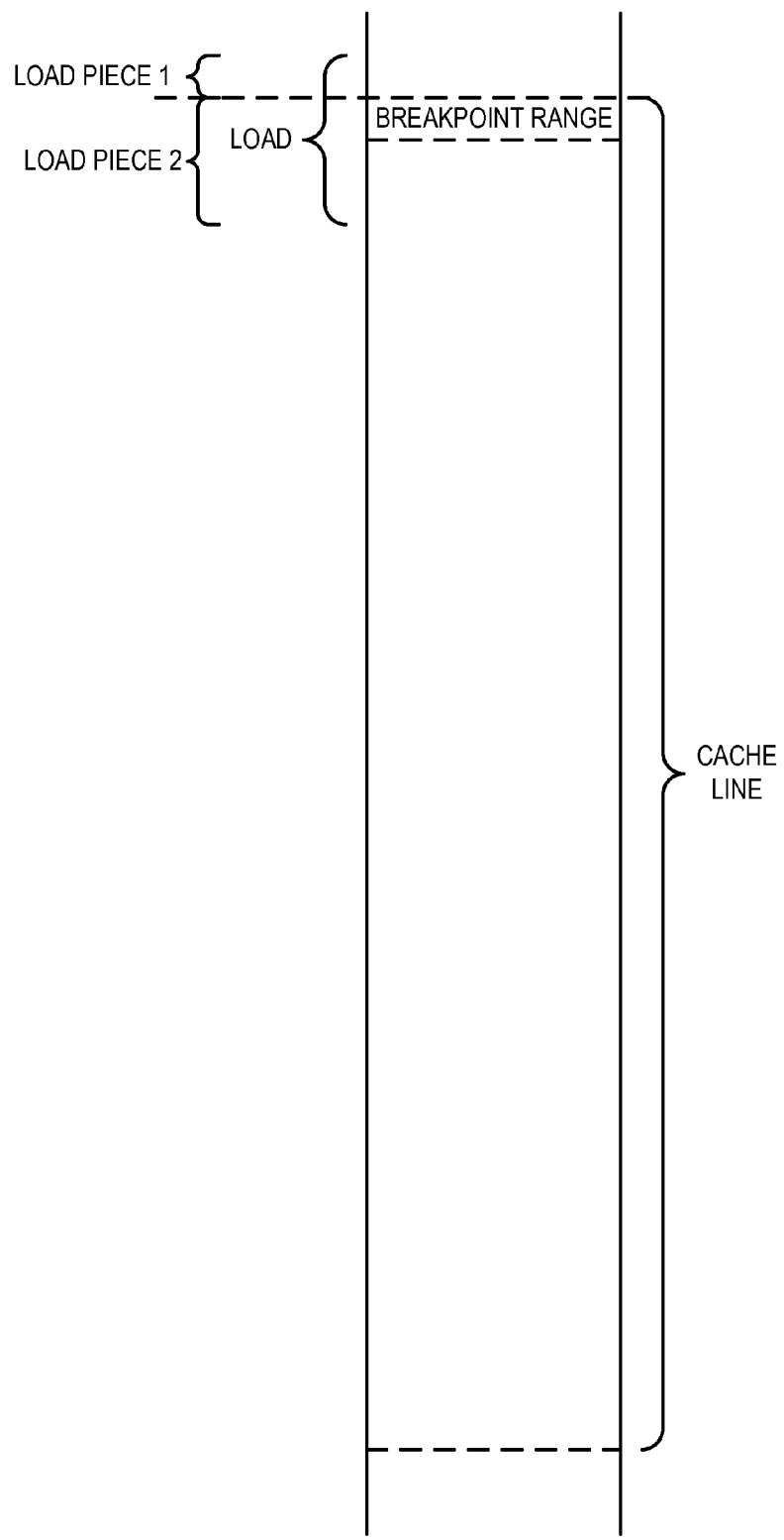
FIG. 4 is a block diagram illustrating a cache-line crossing load operation.

Referring now to FIG. 3, a flowchart illustrating operation of the microprocessor 100 of FIG. 1 including the load unit 185 of FIG. 2 is shown. Flow begins at block 302.

At block 302, a programmer programs the breakpoint registers 162 with one or more breakpoint address ranges. Flow proceeds to block 304.

At block 304, the load unit 185 receives a load instruction that crosses a cache line boundary and does not cross a page boundary. The load unit 185 responsively sends the first piece of the load instruction down the load unit 185 pipeline for processing. In one embodiment, if the load spans two pages, the load unit 185 employs the slower approach mentioned above that requires additional passes through the pipeline. Flow proceeds concurrently from block 304 to blocks 306 and 312.

At block 306, the load unit 185 performs a breakpoint check on the first piece load virtual address 234. That is, the load unit 185 as described above with respect to FIG. 2 generates the hit_page indicator 262 and the brk1or2 signal 266 for the first piece. Flow proceeds to block 308.

At block 308, the load unit 185 saves the hit_page output 262 value in the hp indicator 226 and saves the brk1or2 signal 266 value in the brk1 indicator 228. Flow proceeds from block 308 to block 318.

At block 312, the TLB 218 generates the load physical address 236. Flow proceeds concurrently from block 312 to blocks 314 and 316.

At block 314, the load unit 185 accesses the data cache 186 of the microprocessor 100 of FIG. 1 using the load physical address 236 to obtain the cache data specified by the first piece of the load instruction. Flow proceeds to block 318.

At block 316, the load unit 185 replaces the load virtual address 234 in the address field 224 of the load queue entry 222 with the load physical address 236. Flow proceeds to block 318.

At block 318, the load unit 185 sends the second piece of the load instruction down the load unit 185 pipeline for processing. Flow proceeds to block 322.

At block 322, the incrementer 216 of FIG. 2 increments the least significant cache line bit of the load physical address 236 to generate the incremented lower/offset result 238, as discussed above with respect to FIG. 2. Flow proceeds concurrently from block 322 to blocks 324 and 326.

At block 324, the load unit 185 performs a breakpoint check on the second piece using the hp indicator 226 and the incremented lower/offset bits 238. That is, mux 212 selects the hp indicator 226 and mux 214 selects the incremented result 238 and provides it to the offset comparators 206 to generate the hit_offset signal 264 for the second piece each for use in generating the brk1or2 signal 266 for the second piece, as described above with respect to FIG. 2. Flow proceeds to block 328.

At block 326, the load unit 185 accesses the data cache 186 using the incremented load physical address 238 to obtain the cache data specified by the second piece of the load instruction. Flow proceeds to block 328.

At block 328, the load unit 185 signals a breakpoint via brk signal 272, as described above. Flow proceeds to block 332.

At block 332, the load unit 185 completes the load instruction, i.e., signals the ROB 172 that the load instruction has completed its execution. Flow ends at block 332.

As may be observed from the description of the embodiments of FIGS. 1 through 4, the microprocessor 100 advantageously checks for breakpoints for load instructions that cross a cache line boundary, and do not cross a page boundary, in only two passes through the load unit 185 pipeline, rather than incurring two additional passes. Furthermore, the microprocessor 100 advantageously does not require the die real estate and power expense of having a second address field in each load queue entry 222, but instead only requires the addition of one bit of storage per breakpoint register 162 in each load queue entry 222 and some additional logic, namely mux 214 and AND gate 242.

Figure 5:
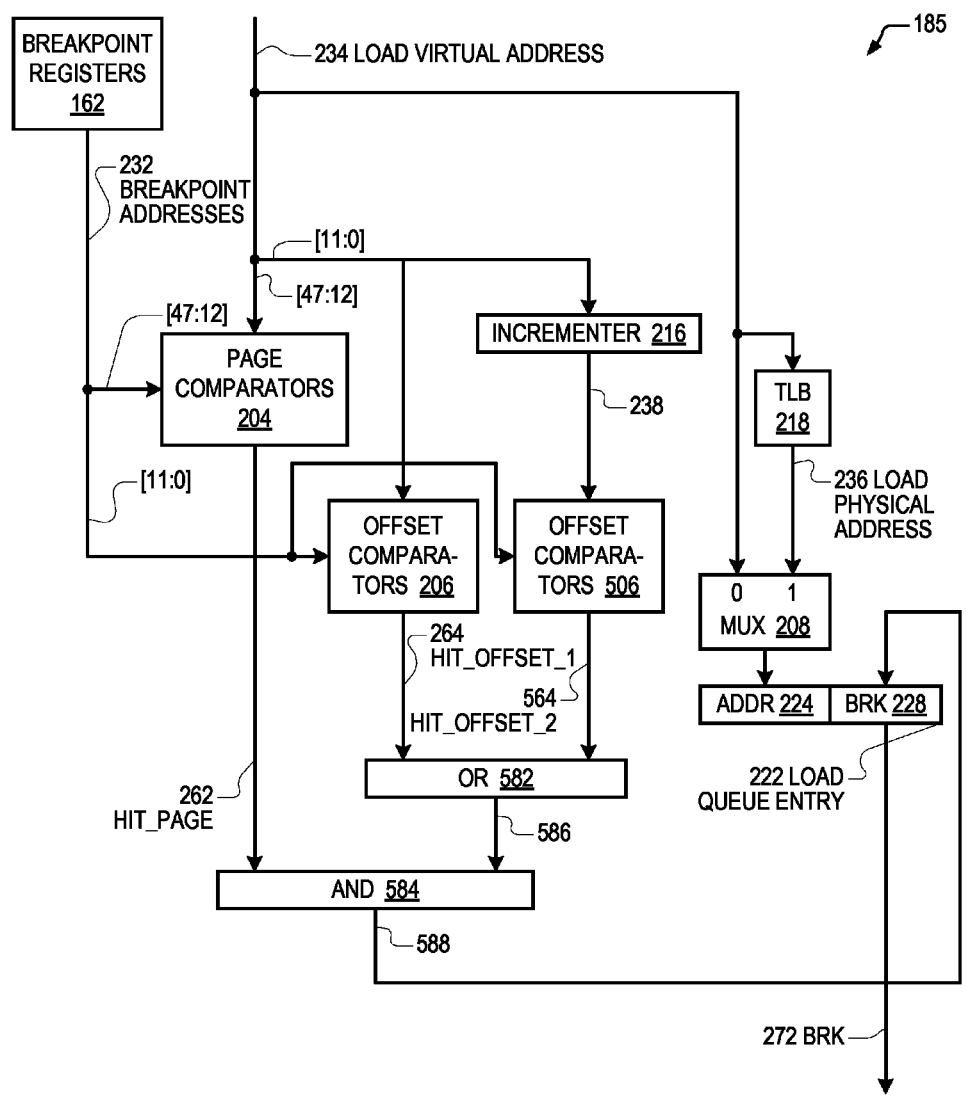
FIG. 5 is a block diagram illustrating a load unit of the microprocessor of FIG. 1 according to an alternate embodiment.

Referring now to FIG. 5, a block diagram illustrating a load unit 185 of the microprocessor 100 of FIG. 1 according to an alternate embodiment is shown. The embodiment of FIG. 5 performs the breakpoint check on both pieces during the first pass down the load unit 185 pipeline and advantageously shares the page comparators 204 for the two pieces. Differences between the embodiment of FIG. 5 from the embodiment of FIG. 2 will now be described.

The embodiment of FIG. 5 does not include mux 212, mux 214, AND gate 242, OR gate 244, AND gate 246, or hp field 226 of FIG. 2.

The load unit 185 of the embodiment of FIG. 5 includes a first set of offset comparators 206 that perform a range check for the lower/offset bits of the first piece of the load operation similar to the range check performed by the offset comparators 206 as described above with respect to FIG. 2. That is, in the embodiment of FIG. 5, the first set of offset comparators 206 receive the lower/offset bits of the load virtual address 234 and compare them with the lower/offset bits of the breakpoint addresses 232 to perform the range check on the first piece of the load operation and generate a hit_offset_1 signal 264 that is true if the lower/offset bits 254 fall within any of the ranges specified in the breakpoint registers 162. The load unit 185 also includes a second set of offset comparators 506 that perform a similar range check for the lower/offset bits of the second piece of the load operation. In the embodiment of FIG. 5, the incrementer 216 receives the lower/offset bits of the load virtual address 234. The second set of offset comparators 506 receive the output bits 238 of the incrementer 216 and compare them with the lower/offset bits of the breakpoint addresses 232 to perform the range check on the second piece of the load operation and generate a hit_offset_2 signal 564 that is true if the incremented bits 238, i.e., lower/offset bits of the second piece of the load operation, fall within any of the ranges specified in the breakpoint registers 162.

A 2-input OR gate 582 receives the hit_offset_1 264 and the hit_offset_2 564 indicators to generate an output 586. A 2-input AND gate 584 receives the output 586 of the OR gate 582 and the hit_page 262 indicator to generate an output 588 that is true if either the first or second piece triggered a breakpoint. The output 588 is provided to the brk1 indicator field 228. The brk1 indicator 228 is provided as brk indicator 272 on the second pass.

Figure 6:
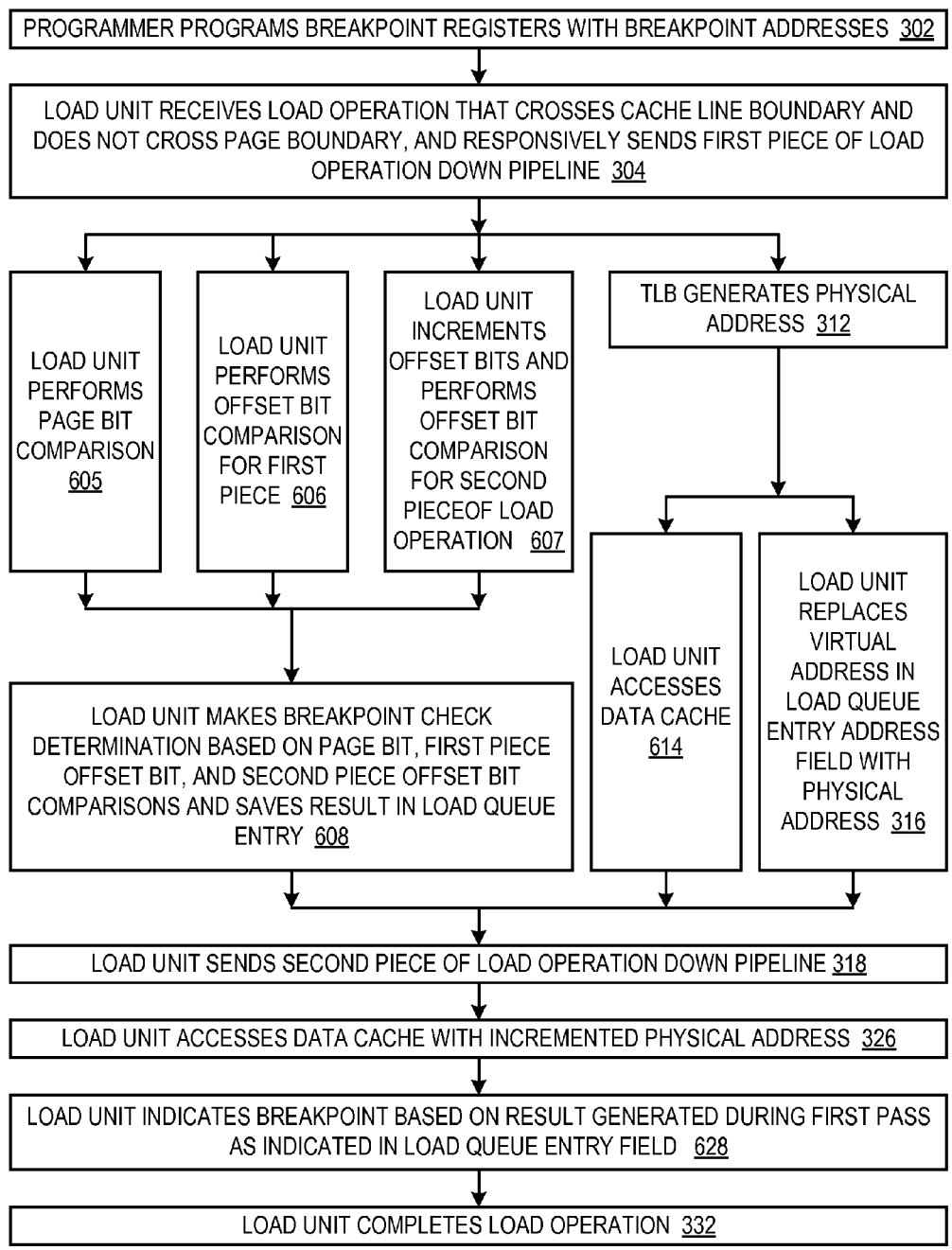
FIG. 6 is a flowchart illustrating operation of the microprocessor of FIG. 1 including the load unit of FIG. 5.

Referring now to FIG. 6, a flowchart illustrating operation of the microprocessor 100 of FIG. 1 including the load unit 185 of FIG. 5 is shown. Blocks that are numbered the same as FIG. 3 are similar. In particular, blocks 302, 304, 312, 316, 318, 326, and 332 are similar. Differences between FIG. 6 from FIG. 3 will now be described.

Flow proceeds concurrently from block 304 to blocks 605, 606, 607, and 312.

At block 605, the page comparators 204 perform the page bit comparison. Flow proceeds to block 608.

At block 606, the offset comparators 206 perform the offset bit comparison for the first piece. Flow proceeds to block 608.

At block 607, the offset comparators 506 perform the offset bit comparison for the second piece. Flow proceeds to block 608.

At block 608, the OR gate 582 and AND gate 584 generate the result 588 that is stored into the brk1 field 228 at the end of the first piece pass through the pipeline 185. Flow proceeds from block 608 to block 318.

Flow proceeds concurrently from block 312 to blocks 614 and 316.

At block 614, the load unit 185 accesses the data cache 186 using the physical address 236 of the first piece generated at block 312. Flow proceeds to block 318 where the second piece proceeds down the pipeline.

Flow proceeds from block 318 to block 326. In one embodiment, during the second pass, the incrementer 216 increments the lower/offset bits of the physical address value output by the address field 224 to generate the incremented physical address used to access the data cache 186 at block 326. In an alternate embodiment, the upper bits 236 generated by the TLB 218 are concatenated with the incremented lower/offset bits 238 during the first pass and the resulting incremented physical address is stored in the address field 224 which is used to access the data cache 186 at block 326. Flow proceeds from block 326 to block 628.

At block 628, the load unit 185 signals a breakpoint via brk signal 272, which is the output of the brk indicator 228. Flow proceeds from block 628 to block 332. Flow ends at block 332.

It is noted that in the embodiment of FIGS. 2 and 3, the number of hitpage bits 226 that must be added to each load queue entry 222 increases with the number of breakpoint registers. Thus, in a microprocessor that includes a relatively large number of breakpoint registers, the additional storage added to the load queue entry 222 may be prohibitive. Advantageously, in the alternate embodiment of FIGS. 5 and 6, the amount of space required in the load queue entry 222 does not increase with the number of breakpoint registers. This advantage is obtained in exchange for the additional offset comparators 506.

Although embodiments are described above with respect to load operations, embodiments are also contemplated in which the scheme described above is used to efficiently perform store operations that span two cache lines. In particular, the alternate embodiment of FIGS. 5 and 6 is advantageous with respect to store operations.

Furthermore, although embodiments are described above with respect to debug breakpoint checks, embodiments are also contemplated in which the scheme described above is used to efficiently perform a check to see whether a memory operation that spans two cache lines falls within a virtual address range other than a debug breakpoint range. For example, the scheme described herein may be used to perform a check to see whether a cache line-crossing memory operation falls within one or more user-defined virtual address ranges for the purpose of counting accesses to the address ranges in order to perform software profiling, performance measurement, or non-invasive code debugging (i.e., detecting accesses to a virtual address range without generating a debug exception). The load unit may include a counter that the load unit increments (instead of generating a breakpoint exception) each time the virtual address range is accessed. These uses may be particularly beneficial in multi-processor core configurations in which the memory accesses may be difficult to detect on an external bus. For another example, the operating system may define one or more virtual address ranges to which all but certain privileged programs are prohibited from accessing, and the scheme described herein may be used to perform a check to see whether a cache line-crossing memory operation falls within the prohibited ranges, and if so, the microprocessor generates an exception.

While various embodiments of the present invention have been described herein, it should be understood that they have been presented by way of example, and not limitation. It will be apparent to persons skilled in the relevant computer arts that various changes in form and detail can be made therein without departing from the scope of the invention. For example, software can enable, for example, the function, fabrication, modeling, simulation, description and/or testing of the apparatus and methods described herein. This can be accomplished through the use of general programming languages (e.g., C, C++), hardware description languages (HDL) including Verilog HDL, VHDL, and so on, or other available programs. Such software can be disposed in any known computer usable medium such as semiconductor, magnetic disk, or optical disc (e.g., CD-ROM, DVD-ROM, etc.). Embodiments of the apparatus and method described herein may be included in a semiconductor intellectual property core, such as a microprocessor core (e.g., embodied in HDL) and transformed to hardware in the production of integrated circuits. Additionally, the apparatus and methods described herein may be embodied as a combination of hardware and software. Thus, the present invention should not be limited by any of the exemplary embodiments described herein, but should be defined only in accordance with the following claims and their equivalents. Specifically, the present invention may be implemented within a microprocessor device which may be used in a general purpose computer. Finally, those skilled in the art should appreciate that they can readily use the disclosed conception and specific embodiments as a basis for designing or modifying other structures for carrying out the same purposes of the present invention without departing from the scope of the invention as defined by the appended claims.

We claim:

1. A microprocessor configured to perform a full breakpoint check on a cache line-crossing load/store operation (CLCLSO), the CLCLSO specifying a load/store virtual address of data, wherein a first piece of the data is within a first cache line and a second piece of the data is within a second cache line, the microprocessor comprising:
   a breakpoint register configured to store a breakpoint address;
   a queue of entries, wherein each of the entries includes first storage for storing an address associated with a respective load/store operation and second storage for storing an indicator that indicates whether there is a match between a page address portion of a load/store virtual address specified by the respective load/store operation and a page address portion of the breakpoint address, wherein the CLCLSO is one of the respective load/store operations; and
   a load/store unit pipeline coupled to the breakpoint register and the queue, wherein the load/store unit pipeline is configured to execute the CLCLSO during first and second passes through the load/store unit pipeline to access the first and second pieces of the data, respectively, with a cache memory;
   wherein during the first pass, the load/store unit pipeline performs a first piece breakpoint check using the load/store virtual address specified by the CLCLSO, populates the indicator in the second storage associated with the CLCLSO, and populates the first storage associated with the CLCLSO with a load/store physical address resulting from translation of the load/store virtual address specified by the CLCLSO;
   wherein during the second pass, the load/store unit pipeline performs a second piece breakpoint check using the indicator received from the second storage associated with the CLCLSO and an incremented version of a page offset portion of the load/store physical address received from the first storage associated with the CLCLSO;

wherein the load/store unit pipeline is configured to access the cache memory and perform the full breakpoint check for the CLCLSO in no more than two passes through the load/store unit pipeline; and wherein the first storage in each of the queue entries is the only storage for storing an address associated with the respective load/store operation.

2. The microprocessor of claim 1, wherein the CLCLSO does not cross a memory page boundary.

3. The microprocessor of claim 1, wherein the load/store unit pipeline is configured to access the cache memory and perform the full breakpoint check using more than two passes through the load/store unit pipeline for load/store operations that cross a memory page boundary.

4. The microprocessor of claim 1, wherein, during the first pass, the load/store unit pipeline accesses the cache memory using the load/store physical address resulting from translation of the load/store virtual address specified by the CLCLSO to load/store the first piece of data, and wherein, during the second pass, the load/store unit pipeline accesses the cache memory using the incremented version of the page offset portion of the load/store physical address received from the first storage associated with the CLCLSO to load/store the second piece of data.

5. The microprocessor of claim 1, wherein the load/store unit pipeline comprises:

page address comparators configured to compare the page address portion of the load/store virtual address specified by the CLCLSO with the page address portion of the breakpoint address to generate a value that indicates whether there is a match between them, wherein the load/store unit pipeline is configured to populate the second storage associated with the CLCLSO with the value generated during the first pass.

6. The microprocessor of claim 5, wherein the load/store unit pipeline comprises:

a multiplexer, coupled to said page address comparators, configured to select the value generated by the page address comparators during the first pass for use in performing the first piece breakpoint check, and to select the indicator received from the second storage associated with the CLCLSO during the second pass for use in performing the second piece breakpoint check.

7. The microprocessor of claim 6, wherein the load/store unit pipeline comprises:

page offset comparators configured to compare a page offset portion of the load/store virtual address specified the CLCLSO with a page offset portion of the breakpoint address to generate a value that indicates whether there is a match between them during the first pass, and configured to compare the incremented version of the page offset portion of the load/store physical address received from the first storage associated with the CLCLSO with the page offset portion of the breakpoint address to generate a value that indicates whether there is a match between them during the second pass.

8. The microprocessor of claim 7, wherein the load/store unit pipeline is configured to perform the first piece breakpoint check using the value generated by the page address comparators and the value generated by the page offset comparators during the first pass, and wherein the load/store unit pipeline is configured to perform the second piece breakpoint check using the indicator received from the second storage associated with the CLCLSO and the value generated by the page offset comparators during the second pass.

9. A method within a microprocessor having a cache memory for performing a full breakpoint check on a cache-line crossing load/store operation (CLCLSO), the CLCLSO specifying a load/store virtual address of data, a first piece of the data being within a first cache line and a second piece of the data being within a second cache line, the microprocessor including a breakpoint register for storing a breakpoint address, the microprocessor also including a queue of entries, each of the entries including first storage for storing an address associated with a respective load/store operation and second storage for storing an indicator that indicates whether there is a match between a page address portion of a load/store virtual address specified by the respective load/store operation and a page address portion of the breakpoint address, and the microprocessor including a load/store unit pipeline, the method comprising:

during a first pass through the load/store unit pipeline:
performing a first piece breakpoint check associated with the first piece of data, wherein said performing the first piece breakpoint check comprises comparing the breakpoint address with the load/store virtual address specified by the CLCLSO;
populating the indicator in the second storage associated with the CLCLSO; and
populating the first storage associated with the CLCLSO with a load/store physical address resulting from translation of the load/store virtual address specified by the CLCLSO; and during a second pass through the load/store unit pipeline:
performing a second piece breakpoint check associated with the second piece of data, wherein said performing the second piece breakpoint check comprises examining the indicator received from the second storage associated with the CLCLSO and comparing a page offset portion of the breakpoint address with an incremented version of a page offset portion of the load/store physical address received from the first storage associated with the CLCLSO;

wherein the cache memory is accessed and the full breakpoint check is performed for the CLCLSO in no more than two passes through the load/store unit pipeline; and wherein the first storage in each of the queue entries is the only storage for storing an address associated with the respective load/store operation.

10. The method of claim 9, wherein the CLCLSO does not cross a memory page boundary.

11. The method of claim 9, further comprising:
accessing the cache memory and performing the full breakpoint check using more than two passes through the load/store unit pipeline for load/store operations that cross a memory page boundary.

12. The method of claim 9, wherein, during the first pass, the cache memory is accessed using the load/store physical address resulting from translation of the load/store virtual address specified by the CLCLSO to load/store the first piece of data, and wherein, during the second pass, the cache memory is accessed using the incremented version of the page offset potion of the load/store physical address received from the first storage associated with the CLCLSO to load/store the second piece of data.

13. The method of claim 9,
wherein said comparing the breakpoint address with the load/store virtual address specified by the CLCLSO during the first pass comprises comparing the page address portion of the load/store virtual address specified by the CLCLSO with the page address portion of the breakpoint address to generate a value that indicates whether there is a match between them; and wherein said populating the indicator in the second storage associated with the CLCLSO comprises populating the second storage associated with the CLCLSO with the generated value.

14. The method of claim 13, wherein said performing the first piece breakpoint check comprises selecting the value that indicates whether there is a match between the page address portion of the load/store virtual address specified by the CLCLSO and the page address portion of the breakpoint address; and wherein said performing the second piece breakpoint check comprises selecting the indicator received from the second storage associated with the CLCLSO.

15. The method of claim 14, wherein said performing the first piece breakpoint check comprises comparing a page offset portion of the load/store virtual address specified by the CLCLSO with the page offset portion of the breakpoint address to generate a value that indicates whether there is a match between them in conjunction with said comparing the page address portion of the load/store virtual address specified by the CLCLSO with the page address portion of the breakpoint address to generate a value that indicates whether there is a match between them; and wherein said performing the second piece breakpoint check comprises examining the indicator received from the second storage associated with the CLCLSO in conjunction with said comparing the page offset portion of the breakpoint address with the incremented version of the page offset portion of the load/store physical address received from the first storage associated with the CLCLSO.

16. A computer program product encoded in at least one non-transitory computer usable medium for use with a computing device, the computer program product comprising:

computer usable program code embodied in said medium, for specifying a microprocessor configured to perform a full breakpoint check on a cache line-crossing load/store operation (CLCLSO), the CLCLSO specifying a load/store virtual address of data, wherein a first piece of the data is within a first cache line and a second piece of the data is within a second cache line, the computer usable program code comprising:

first program code for specifying a breakpoint register configured to store a breakpoint address;

second program code for specifying a queue of entries, wherein each of the entries includes first storage for storing an address associated with a respective load/store operation and second storage for storing an indicator that indicates whether there is a match between a page address portion of a load/store virtual address specified by the respective load/store operation and a page address portion of the breakpoint address, wherein the CLCLSO is one of the respective load/store operations; and third program code for specifying a load/store unit pipeline coupled to the breakpoint register and the queue, wherein the load/store unit pipeline is configured to execute the CLCLSO during first and second passes through the load/store unit pipeline to access the first and second pieces of the data, respectively, with a cache memory;

wherein during the first pass, the load/store unit pipeline performs a first piece breakpoint check using the load/store virtual address specified by the CLCLSO, populates the indicator in the second storage associated with the CLCLSO, and populates the first storage associated with the CLCLSO with a load/store physical address resulting from translation of the load/store virtual address specified by the CLCLSO;

wherein during the second pass, the load/store unit pipeline performs a second piece breakpoint check using the indicator received from the second storage associated with the CLCLSO and an incremented version of a page offset portion of the load/store physical address received from the first storage associated with the CLCLSO;

wherein the load/store unit pipeline is configured to access the cache memory and perform the full breakpoint check for the CLCLSO in no more than two passes through the load/store unit pipeline;

wherein the first storage in each of the queue entries is the only storage for storing an address associated with the respective load/store operation.

17. The computer program product of claim 16, wherein the CLCLSO does not cross a memory page boundary.

18. The computer program product of claim 16, wherein the load/store unit pipeline is configured to access the cache memory and perform the full breakpoint check using more than two passes through the load/store unit pipeline for load/store operations that cross a memory page boundary.

19. The computer program product of claim 16, wherein, during the first pass, the load/store unit pipeline accesses the cache memory using the load/store physical address resulting from translation of the load/store virtual address specified by the CLCLSO to load/store the first piece of data, and wherein, during the second pass, the load/store unit pipeline accesses the cache memory using the incremented version of the page offset potion of the load/store physical address received from the first storage associated with the CLCLSO to load/store the second piece of data.

20. The computer program product of claim 16, wherein the load/store unit pipeline comprises:

page address comparators configured to compare the page address portion of the load/store virtual address specified by the CLCLSO with the page address portion of the breakpoint address to generate a value that indicates whether there is a match between them, wherein the load/store unit pipeline is configured to populate the second storage associated with the CLCLSO with the value generated during the first pass.

21. The computer program product of claim 20, wherein the load/store unit pipeline comprises:

a multiplexer, coupled to said page address comparators, configured to select the value generated by the page address comparators during the first pass for use in performing the first piece breakpoint check, and to select the indicator received from the second storage associated with the CLCLSO during the second pass for use in performing the second piece breakpoint check.

22. The computer program product of claim 21, wherein the load/store unit pipeline comprises:

page offset comparators configured to compare a page offset portion of the load/store virtual address specified by the CLCLSO with a page offset portion of the breakpoint address to generate a value that indicates whether there is a match between them during the first pass, and configured to compare the incremented version of the page offset portion of the load/store physical address received from the first storage associated with the CLCLSO with the page offset portion of the breakpoint address to generate a value that indicates whether there is a match between them during the second pass.

23. The computer program product of claim 22, wherein the load/store unit pipeline is configured to perform the first piece breakpoint check using the value generated by the page address comparators and the value generated by the page offset comparators during the first pass, and wherein the load/store unit pipeline is configured to perform the second piece breakpoint check using the indicator received from the second storage associated with the CLCLSO and the value generated by the page offset comparators during the second pass.

* * * * *